United States Patent [19]
Datta et al.

[11] Patent Number: 5,567,300
[45] Date of Patent: Oct. 22, 1996

[54] ELECTROCHEMICAL METAL REMOVAL TECHNIQUE FOR PLANARIZATION OF SURFACES

[75] Inventors: Madhav Datta, Yorktown Heights; Terrence R. O'Toole, Webster, both of N.Y.

[73] Assignee: IBM Corporation, Armonk, N.Y.

[21] Appl. No.: 300,623

[22] Filed: Sep. 2, 1994

[51] Int. Cl.$^6$ .................. C25F 3/14; C25F 7/00
[52] U.S. Cl. ............ 205/652; 205/654; 205/668; 205/670; 205/672; 205/674; 205/686; 204/224 M; 204/225
[58] Field of Search ............ 204/129.1, 129.5, 204/129.75, 129.85, 129.95, 224 M, 225; 205/652, 654, 668, 670, 672, 674, 686

[56] References Cited

U.S. PATENT DOCUMENTS

| | | | |
|---|---|---|---|
| 2,315,695 | 4/1943 | Faust | 204/129.85 |
| 2,516,105 | 7/1950 | Mateosian | 204/140.5 |
| 2,695,872 | 11/1954 | Espy | 204/129.85 X |
| 2,861,931 | 11/1958 | Faust, Jr. | 204/129.85 X |
| 3,168,638 | 2/1965 | Riddles | 219/69.14 |
| 3,331,760 | 7/1967 | Powell | 204/129.75 X |
| 3,334,210 | 8/1967 | Williams et al. | 219/69.14 |
| 3,527,682 | 9/1970 | Valvo | 204/129.85 X |
| 4,127,459 | 11/1978 | Jumer | 204/129.1 X |
| 4,290,867 | 9/1981 | Jumer | 204/224 M X |
| 4,997,534 | 3/1991 | Thornton | 204/129.1 |
| 5,026,462 | 6/1991 | Butterfield et al. | 204/129.55 |
| 5,098,533 | 3/1992 | Duke et al. | 204/129.35 |
| 5,108,562 | 4/1992 | Duke et al. | 204/129.65 |
| 5,217,586 | 6/1993 | Datta et al. | 204/129.95 X |
| 5,344,539 | 9/1994 | Shinogi et al. | 204/224 M |
| 5,458,756 | 10/1995 | Bassous et al. | 204/225 X |

OTHER PUBLICATIONS

Contolini et al., "Electrochemical Planarization for Multi-Level Metallization", *Proceeding of the the Second International Symposium of Electrochemical Technology Applications in Electronics*, vol. No. 93-20.

*Primary Examiner*—Donald R. Valentine
*Attorney, Agent, or Firm*—Ratner & Prestia

[57] ABSTRACT

A high speed electrochemical metal removal technique provides for planarization of multilayer copper interconnection in thin film modules. The process uses a neutral salt solution, is compatible with the plating process and has minimum safety and waste disposal problems. The process offers tremendous cost advantages over previously employed micromilling techniques for planarization.

22 Claims, 3 Drawing Sheets

5,567,300

ELECTROCHEMICAL METAL REMOVAL TECHNIQUE FOR PLANARIZATION OF SURFACES

BACKGROUND OF THE INVENTION

The present invention relates to electrochemical planarization of metal surfaces.

Double layer metallurgy (DLM) is a microelectronic fabricating technique for creating a two-layer structure of metal strips in a circuit. The strips, or "lines," act as wires to connect different components of the circuit. The lower layer of metal is deposited into trenches in a non-conducting substrate. The second, upper layer of lines is deposited on top of the lower one. Lines of the upper and lower layers can cross and interconnect, allowing more flexible inter-component wiring than is possible with only a single layer of metal.

DLM fabrication starts with a flat substrate, which might be a silicon wafer or a slab of alumina, glass, or polymer. The substrate could also be a microelectronic structure of transistors, resistors, and capacitors which has been built up on a base substrate by conventional chip-making or chip-packaging techniques (diffusion, lithography, etching, etc.) and which has been made plane on its top surface.

In general the plane surface of the substrate will receive a patterned layer of polyimide (a polymer plastic material) before the first, lower layer of copper or other conductive metal is plated on. The polyimide layer is about 10 to 150 micron thick. (A micron, μm, or micrometer, is a millionth of a meter. 100 microns is a tenth of a millimeter or 0.004 inch.) The polyimide layer is patterned with gaps through which the bare substrate is exposed. The gaps, because they are generally elongated to form the metal lines, are called trenches.

FIG. 1, labelled "prior art," shows a cross-section of a substrate S with a polyimide P layer. Two trenches are shown. The narrow trench on the left is bordered by two sections of the polyimide P layer. A left-hand edge of a wide trench is shown on the right.

Copper is damascene plated onto the patterned substrate S and polyimide P, blanketing both with a layer of copper metal. This is shown in FIG. 2, labelled "prior art," where the copper is indicated by "Cu". The copper layer tends toward uniform thickness, but will bridge small openings in the polyimide P pattern, which tend to fill in as the plating accumulates. The POR (Plan of Record) commercial electroplating process exhibits this behavior.

If the trenches are narrow only a crease or cleft R is left in the upper surface of the copper plated layer, as shown in FIG. 2. Narrow polyimide gaps yield trenches with relatively small cleft depth. Since the surface becomes flatter as the copper thickness increases, it is said to be "planarized" by the copper fill-in.

On the other hand, wide trenches in the polyimide remain un-planarized after plating, as is shown on the right in FIG. 2. The copper layer is generally uniform in thickness, so it follows the original surface of the polyimide P layer, except for rounding of sharp corners.

Planarization (planing) of the first metal layer is required for DLM. FIG. 3, labelled "prior art," shows the copper layer of FIG. 2 after planarization.

PLANARIZATION IS DESIRABLE FOR TWO REASONS

First, the copper is desirably removed from areas outside the trenches to form the lines. The next layer of lines can then be laid out in a pattern of cross-wiring on the flat surface. In FIG. 3 the second-level lines would lie parallel to the plane of the page.

Second, when using optical lithography, the layer's pattern is contained in an image projected through a lens onto the substrate, which is coated with a light-sensitive material called photoresist. The light hardens the photoresist that will form the trenches, while the unexposed photoresist is not cured and can be washed away. Due to built-in limitations of lenses, the image cannot be focussed onto a surface that is not perfectly flat.

THERE ARE VARIOUS PLANARIZATION METHODS

Micro-milling is one conventional planarization technique. Micro-milling is simply a miniaturized version of ordinary milling, employing a rotating milling cutter turned by a motor and mechanically scanned across a workpiece (here, the substrate) to level the surface.

The micro-milling method of planarization has several problems: alignment of parts to the plane of the milling cutter; induced stresses from the cutting operation that can cause cracking and delimitation; and contamination of the polyimide by smeared copper form the milling cutter. Micro-milling is also expensive. It involves a large capital cost and much labor. The yield (percentage of good parts emerging from the process) is low.

In an article based on research performed at Lawrence Livermore National Laboratory, Robert J. Contolini et al., "Electrochemical Planarization for Multi-Level Metallization", *Proceedings of the Second International Symposium of "Electrochemical Technology Applications in Electronics"*, Vol. No. 93–20, an electrochemical planarization technology is described which involves electroplating followed by electropolishing. As a result of the disclosed technology, a very flat surface containing embedded conductors is formed. Although a thickness uniformity of better than +/−2% across a 100 mm wafer is obtained, the disclosed technology relies on an extremely complex tool and uses phosphoric acid—which is an extremely dangerous and aggressive electrolyte.

Electrochemical machining (ECM) is an alternative to mechanical planarization. ECM is based on electrochemical etching, the dissolving of metals by a combination of salty water and electricity in a speeded-up, controlled sort of corrosion. ECM is safe, non-polluting, and often cheaper than mechanical machining. It can be used to machine very hard metals and cut cleanly through metal foils. It leaves no stress in the worked material and no deposits.

FIG. 4, labelled "prior art," illustrates the background art of electrochemical etching. The apparatus shown is a basic electroetching cell. A tank T holds liquid electrolyte E, an aqueous solution of a salt. Two electrodes, the anode A and the cathode C, are wired to a voltage source such as a battery B. When the apparatus is electrified, metal atoms in the anode A are ionized by the electricity and forced out of the metal into the solution, and the metal anode A dissolves into the water. The rate of dissolution is proportional to the electric current, according to Faraday's law. Depending on the chemistry of the metals and salt, the metal ions from the cathode either plate the cathode, fall out as precipitate, or stay in solution.

In conventional ECM, the cathode is a shaped tool held close to the anode and slowly moved toward it while electrolyte is pumped through the inter-electrode gap. The anode is the workpiece, and the cathode corresponds to the cutter of a mechanical machine tool which is slowly moved toward the work; the workpiece assumes the shape of the cathode as the operation progresses. There is no wear on the cathode, as the electrodes never touch. ECM can be used to make complex pieces like gears.

In ECM metal is removed simply by bringing the cathode progressively nearer the work piece. The highest dissolution rates on the anode are in places where the cathode has closely approached the anode surface, and the rate falls off as the inter-electrode distance increases. This is because of electrical field effects. Because of these effects the shape taken on by the anode is not exactly the shape of the cathode, and ECM tool designers must solve the Laplace equation, or use experimental methods involving electrically resistive paper, in order to get the proper cathode shape. See Electrochemical Machining, A. E. De Barr and D. A. Oliver ed., at pp. 155 et seq. (American Elsevier, New York, 1986).

Electrolyte flow between the cathode and the workpiece is fast in conventional ECM, to speed etching and carry away heat. Pumping can be a problem due to the close spacing and high flow rates. Viscous liquids are not desirable for ECM electrolyte because they aggravate the pumping problem.

A variation of conventional ECM is the machining of thin films with or without a photoresist mask, also called electrochemical micromachining (EMM).

By choosing proper electrolyte and electrical conditions electropolished surfaces can be achieved in ECM and EMM. As the name implies, electropolishing creates a very smooth mirror-like surface, said to be specular or bright, whose roughness is smaller than a wavelength of light. Unlike a mechanically polished surface, an electropolished surface has no built-up stress left by the high pressures of machining and mechanical polishing.

Broad irregularities, such as the 10–150 micron high copper surface elevations shown in FIG. 2, cannot be planarized by either electroetching or electropolishing. However, narrower irregularities like the cleft R can be removed by electropolishing and/or electroetching.

During anodic dissolution, the concentration of metal ions at the anode surface is significantly different from that of the bulk. Since these concentrations are mainly determined by the rate of mass transport, transport mechanisms and diffusion layer thickness play an important role in high rate anodic dissolution (see M. Datta, IBM Journal of Research and Development, no. 37, p 207, 1993). The Nernst diffusion layer concept is used to obtain a simplified description of Mass transport effects in high-rate anodic dissolution of metals. According to this concept, a stagnant diffusion layer is assumed to exist at the anode. The dissolved metal ions that are produced at the anode are transported into the bulk electrolyte by convective diffusion. This leads to a concentration gradient inside the diffusion layer. Outside the diffusion layer, transport occurs by convection. The thickness of the diffusion layer depends on the hydrodynamic conditions, i.e. the degree of electrolyte agitation and physical properties of the electrolyte such as its viscosity. Under ECM conditions the diffusion layer thickness may vary between 10 and 50 microns. The diffusion layer, thus, tends to bridge the narrow gaps but follow the contours of wider features.

FIG. 5, labelled "prior art," shows a diffusion layer D bridging the cleft R but following the contours of the wide trench on the right side of FIG. 2. Planarization of wide features does not occur under mass transport/electropolishing conditions.

Viscosity of the electrolyte is a factor in the amount of Brownian motion, so diffusion is slowed down by adding to the electrolyte substances that increase the viscosity of the electrolyte. Increasing the electrolyte viscosity thickens the diffusion layer and promotes surface polishing. (See A. E. De Barr and D. A. Oliver at page 102.)

The diffusion layer could perhaps be thickened to the point where it would bridge wider features, but this would require making the electrolyte extremely viscous. Extremely high viscosity would slow the rate of metal removal and prevent the electrolyte from being pumped through the electrolytic cell at adequate speeds.

Mixing an aqueous electrolyte with a viscous liquid generally results in a more viscous electrolyte, as would be expected. Glycerine, which has a viscosity at room temperature about 1500 times that of water, is used in electroetching to increase the electrolyte viscosity and promote polishing. The viscosity of a mixture of two liquids is not the average of their viscosities, in general.

The electrical resistivity of an aqueous electrolyte can also be increased by adding certain substances. (Resistivity, or specific resistivity, is a property of the electrolyte substance and not of the cell geometry. Its relation to the electrical resistance of the cell is like that of density to mass.) Resistance additives are not the same as viscosity additives, however; a substance which increases viscosity may not increase resistance at all, or may increase it very much. Scientists' attempts to find a relation between the viscosity of electrolytes their resistivity have been unsuccessful. Viscosity and resistivity appear to be independent. Thus an additive substance may increase the viscosity without increasing the resistance of an electrolyte, or conversely.

Electrolyte resistivity has an effect on electroetching, but the effect is of a different sort from that caused by viscosity.

The viscosity, as discussed above, affects diffusion in the region very close to the metal surface to alter the so-called tertiary current distribution in the electrolytic cell.

Electrical resistance affects only the primary current distribution. The primary current distribution is related to Ohm's law and is a function of the electrolyte resistivity, any internal resistance of electrodes, and the cell geometry.

Several inventors have taught the use of organic substances dissolved in an aqueous electrolyte solution for electropolishing.

E. Der Matosian, in U.S. Pat. No. 2,516,105, teaches electrolytic polishing of metals. He discloses the use of organic solvents as part of the electrolyte solution (at col. 2, line 26), and mentions various substances, including ethylene glycol (end of col. 2). The function of the glycol is given as concentration polarization at the anode.

U.S. Pat. No. 2,315,695, issued to Charles Faust, also mentions alcohol, glycerol, glycerine, ethylene glycol and other organics for electropolishing.

Milton J. Riddles and Josephine Williams, in U.S. Pat. No. 3,334,210, disclose an electrolyte formula based on polyethylene glycols in an aqueous solution. The solutions are employed in arc machining with high-frequency electrical discharges.

SUMMARY OF THE INVENTION

Accordingly, the present invention relates to electrochemical planarization of a first electrode surface, an electrochemical cell comprises a second electrode generally parallel to the first electrode surface; an aqueous electrolyte disposed between the second electrode and the first electrode surface; an electrical resistance additive substance mixed with the electrolyte to form a resistive electrolytic mixture; and a source of voltage. When a potential difference is placed across the cell by the source of voltage, the first electrode surface is electrochemically planarized.

DETAILED DESCRIPTION OF THE PREFERRED EMBODIMENT

The present invention relates to an electrochemical micromachining (EMM) process and apparatus for planarizing (planing or making flat) uneven metal surfaces. It is especially useful for fabricating DLM structures for microelectronic circuits.

The invention employs an electrolyte made electrically resistive through the addition of a non-conducting organic substance, such as ethylene glycol. The increased resistivity of the electrolyte increases the differential in etching rates between high and low areas, causing planarization of the metal surface.

The invention also uses a short inter-electrode distance between the etched surface and the cathode.

A linear multi-nozzle electrode assembly which localizes both electrolyte flow and current along a small area of the sample is preferably used for etching. The multi-nozzle electrode is slowly scanned back and forth over the substrate. Concentration of etching in a small area allows high current density for electropolishing without the need for a large total current, reduces stray currents, improves electrolyte flow, and allows simpler and less expensive mechanical fabrication.

Throughout the specification, the following definitions apply:

electrolyte (when applied to an aqueous solution)—a solution with both water and solute, and not just the solute;

immerse—to wet over at least a portion of a surface;

linear—having a portion following a smoothly curved or straight line;

parallel (when referring to the spatial relationship between objects, surfaces, or lines)—uniformly spaced apart by a distance greater than the irregularities of the object, surface or line;

planarization—either making plane or making smooth;

smooth—locally plane or flat;

substrate—a flat, plane, or smooth surface, whether of solid or composite structure;

voltage means—a power supply, battery, or other conventional voltage or current supply, or connection to such a conventional supply.

Figure 6:
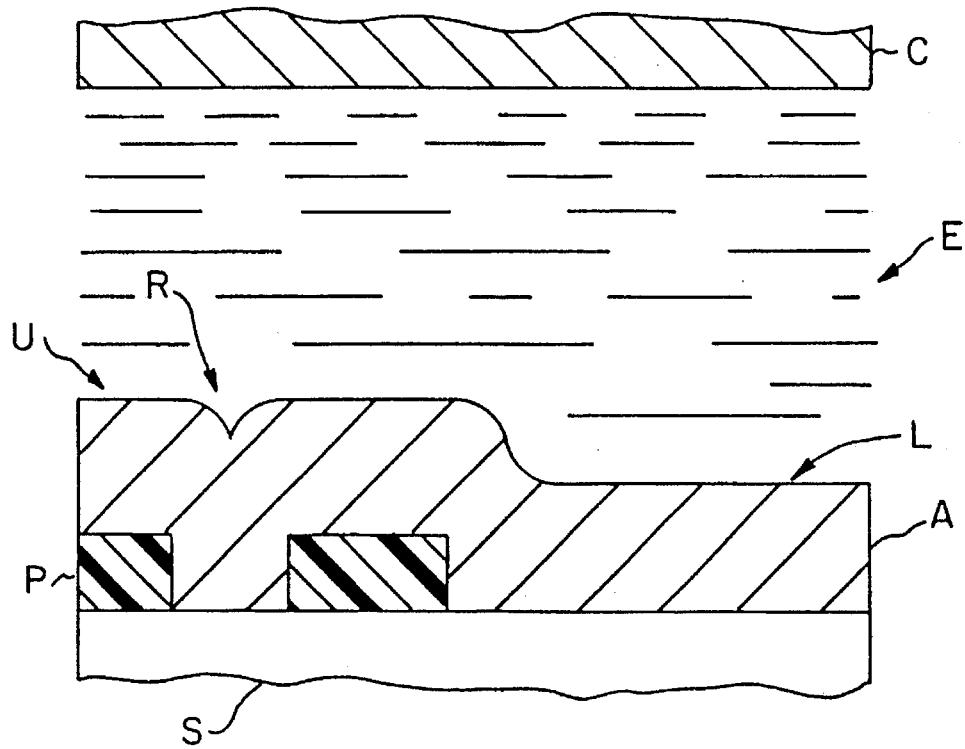
FIG. 6 is a schematic view of the present invention applied to the copper layer of FIG. 2.

An electrolytic cell is shown in FIG. 6. In FIG. 6 the copper Cu layer is labelled A for anode. The layer A has a cleft R, a lower surface L over a wide trench, and an upper surface U over the polyimide P layer. Disposed above the anode A is a cathode C, which has a plane or straight surface aligned parallel to the substrate S, which is flat. An electrolyte E fills the space between the anode A and cathode C.

The cathode C and the anode A are connected to the negative and positive poles, respectively, of a power supply or other conventional device which can establish a voltage between them (not shown). The anode A and cathode C, being of metal, have essentially constant respective voltages throughout. Thus, the facing parallel surfaces are each at a respective equipotential.

The applied voltage from the voltage source B causes an electric current to flow in the electrolyte E between the anode A and cathode C. The amount of current is given by Ohm's law, $I = E/R$, where I is current in amperes, E is the potential difference between the electrodes in volts, and R is the resistance of the electrolyte in ohms.

The resistance R of the electrolyte between the anode A and cathode C is a function of the cell geometry and the electrolyte resistivity. If in FIG. 6 the electrolyte is drained and replaced with electrolyte of higher resistivity but the distance between the anode A and cathode C is kept constant, then the cell resistance will be increased in the same proportion as the resistivity. The resistance may be constant if the electrolyte resistivity is increased but at the same time the inter-electrode distance is decreased.

For fast etching of the copper anode A, the total current I flowing through a cell must be kept high. This is a consequence of Faraday's law of electrochemistry, which says that the amount of metal removed in electroetching is proportional to the electric current and to the etching time. Current density (current/surface area at the anode) should be high, too, for polishing and smoothing of the surface.

The voltage drop between the positive anode and negative cathode is, to a first approximation, distributed evenly across the width of the electrolyte. Referring again to FIG. 6, each electrode surface is an equipotential line (line of constant voltage); within the electrolyte, lines of constant voltage are generally horizontal and parallel to the electrode surfaces.

A more-resistive electrolyte will cause a greater voltage drop between the electrodes; there will be more equipotential lines in the inter-electrode space. The more crowded lines mean a greater voltage gradient, which will accelerate the planing action caused by bending of the equipotential lines near protrusions from the anode A surface.

Thus, a first aspect of the invention involves the use of an electrolyte with increased resistivity.

The resistivity of a salt/water electrolyte is of the order of a few ohms across a cubic centimeter of electrolyte. It varies with the salt and the temperature, but the main factor in resistivity is the concentration of the solution. To increase resistivity, the salt concentration can be lowered. However, to provide enough water ions for fast etching, the salt concentration should be high. In the present invention, it is desired to increase the electrolyte resistivity but not to decrease the number of ions.

To increase the resistivity while maintaining high salt concentration, the present invention employs non-conducting additives to the aqueous electrolyte of the cell.

The preferred additive is 2 M ethylene glycol. ("M" is molarity) It is conventional in the art to use additives such as ethylene glycol for deburring of protrusions; see The Electrolytic and Chemical Polishing of Metals by W. J. McG. Tegart (Pergamon Press, London, 1956). However, the mechanism has not been analyzed. Ethylene glycol does not have an extremely large viscosity, as glycerine does. Glycol's viscosity is about 20 centipoises at room temperature, as compared to 1.0 centipoise for water and 1500 for glycerine.

Since viscosity is affected greatly by temperature, the invention contemplates maintaining electrolyte within a specified temperature range.

The preferred electrolyte is 3 M $NaNO_3$ (sodium nitrate) in water. In a nitrate electrolyte, metal dissolution is not accompanied by oxygen evolution. Sodium nitrate is therefore preferable to phosphoric acid where oxygen evolution causes pitting on the copper anode A surface. NaCl (sodium chloride) at the same molarity is also useful for the invention.

Electropolishing takes place above the limiting current. Current rises with voltage at first, then levels off. The plateau current is the "limiting" current, even though the current can rise higher if enough voltage is applied. Anodic polarization of copper in nitrate is qualitatively the same as in phosphoric acid (used in the LLNL device) but the limiting current in phosphoric acid is much lower than in sodium nitrate solution, because in phosphoric acid oxygen evolution takes place below the limiting current. Oxygen evolution under extreme conditions leads to pits and cavities. In nitrate, on the other hand, the dissolution valence of copper is lower than 2 at current densities higher than the limiting current plateau. Because there is no oxygen evolution, no pitting or cavitation is present with the nitrate solution.

By employing high electrolyte flow rates, very high metal removal rates can be achieved in an electrolyte containing sodium nitrate and glycol. Except for influencing the cell voltage, the use of glycol does not have any significant effect on the dissolution rate of the metal.

One aspect of the invention, the use of non-conducting additives to increase electrolyte resistivity, depends in part upon the cell geometry. For smoothing of the surface irregularities of the copper anode A (planarization) at the same rate all over the anode A, the cathode C surface is desirably parallel to the anode A surface, so that the average inter-electrode distance is constant over the whole substrate S. The inter-electrode distance varies locally, since the anode A is rough and in need of planarizing. If the cathode C is cocked, then the resistance across the anode A will vary and so will the current density, the etching rate, and the degree of planarization. Thus, the cathode C surface should be parallel to the average level of the anode A surface.

Another aspect of the invention is short inter-electrode spacing, on the order of millimeters.

Referring again to FIG. 6, it is seen that the inter-electrode spacing between the upper surface U and the cathode C is comparable to that between the upper surface U and the cathode C. The absolute elevation difference between the surfaces U and L does change if the cathode C is moved farther away, but the proportional difference between the inter-electrode distances C–U and C–L is decreased.

If the cell of FIG. 6 is divided down the middle, so that there are two independent cells having different respective inter-electrode spacings, the cell with the lesser spacing has lower resistance, because the electrolyte distance traversed by the current is shorter. If the spacing of both cells is increased by the same amount, the percentage difference in cell resistances decreases as both resistances' absolute values is increased. Therefore, the difference in etching rate decreases too if the same voltage is applied across both. That is, increases as the inter-electrode spacings decrease.

Returning to the united cell of FIG. 6, the two sides act somewhat as would two independent cells. This is because current tends to go straight across from anode to cathode. In a broad flat area, whether high or low, the lines of equipotential are generally flat. Current flows directly across the equipotential lines; current parallel to the electrode surfaces is minimal. At corners and edges of the anode A surface the equipotential lines bend, and the current has a horizontal component. In smoothing a rough anode surface, the etching rate differential again increases as the inter-electrode spacing decreases.

The proportional etching rate difference between high and low areas of the anode A results in planarization. The absolute etch rate is irrelevant to planarization, but a high absolute rate is desirable for fast production.

The second aspect of the invention augments the first aspect. A highly-resistive electrolyte does not increase the percentage difference in current due to decreasing the inter-electrode gap; but resistive electrolyte increases the total current and so increase the absolute current difference for a given proportional difference. Moreover, the more closely-spaced the electrodes the lower the voltage that needs to be applied to the cell to maintain a given current.

As with the first aspect of the invention, geometry is again important for the second aspect. The cathode C and anode A are desirably parallel. In addition, the cathode C surface is desirably relatively smooth as compared to the anode A surface. If the cathode C surface is rough planarization may not occur; instead, the anode surface may take on the contours of the cathode instead of being smoothed, as in large-scale conventional ECM.

Figure 1:
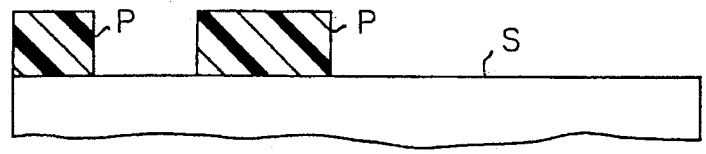
FIG. 1, labelled "prior art," is a cross-sectional view of a substrate and polyimide layer.
Figure 2:
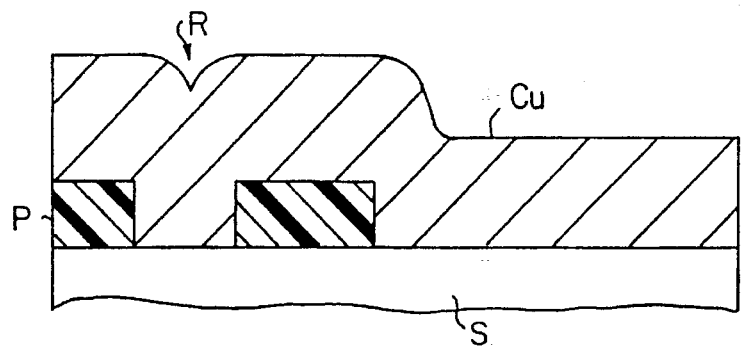
FIG. 2, labelled "prior art," is cross-sectional view of the substrate of FIG. 1 with damascened copper filling narrow and wide trenches in the polyimide layer.
Figure 3:
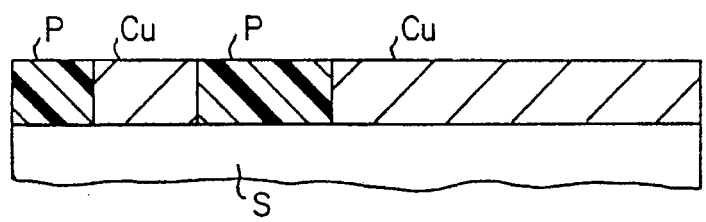
FIG. 3, labelled "prior art," shows the copper layer of FIG. 2 after planarization.
Figure 4:
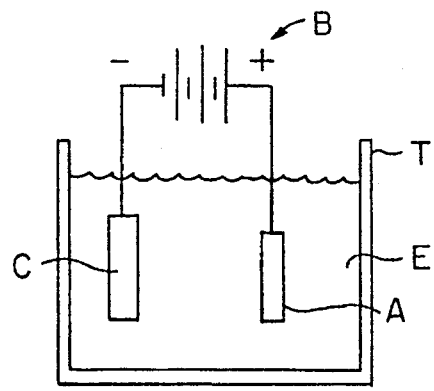
FIG. 4, labelled "prior art," is a schematic view of an electropolishing apparatus.
Figure 5:
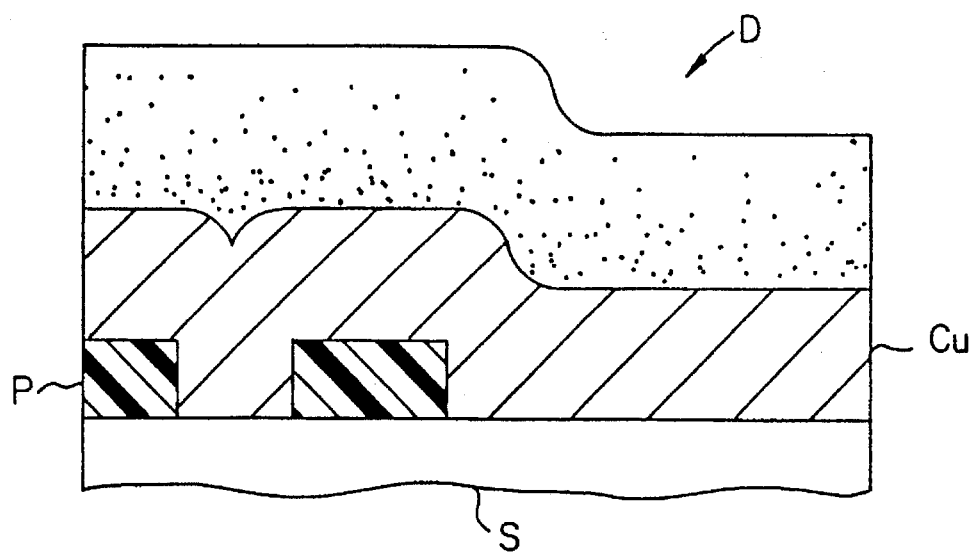
FIG. 5, labelled "prior art," shows a diffusion layer formed over the copper layer of FIG. 2 during electroetching.

The rate differential and the thickness of the plated copper layer of the anode A can be adjusted to allow the surface to be planarized as shown in FIG. 3.

A third aspect of the present invention is the use of a linear electrode which is scanned slowly back and forth over the anode, parallel to the substrate surface.

Figure 7:
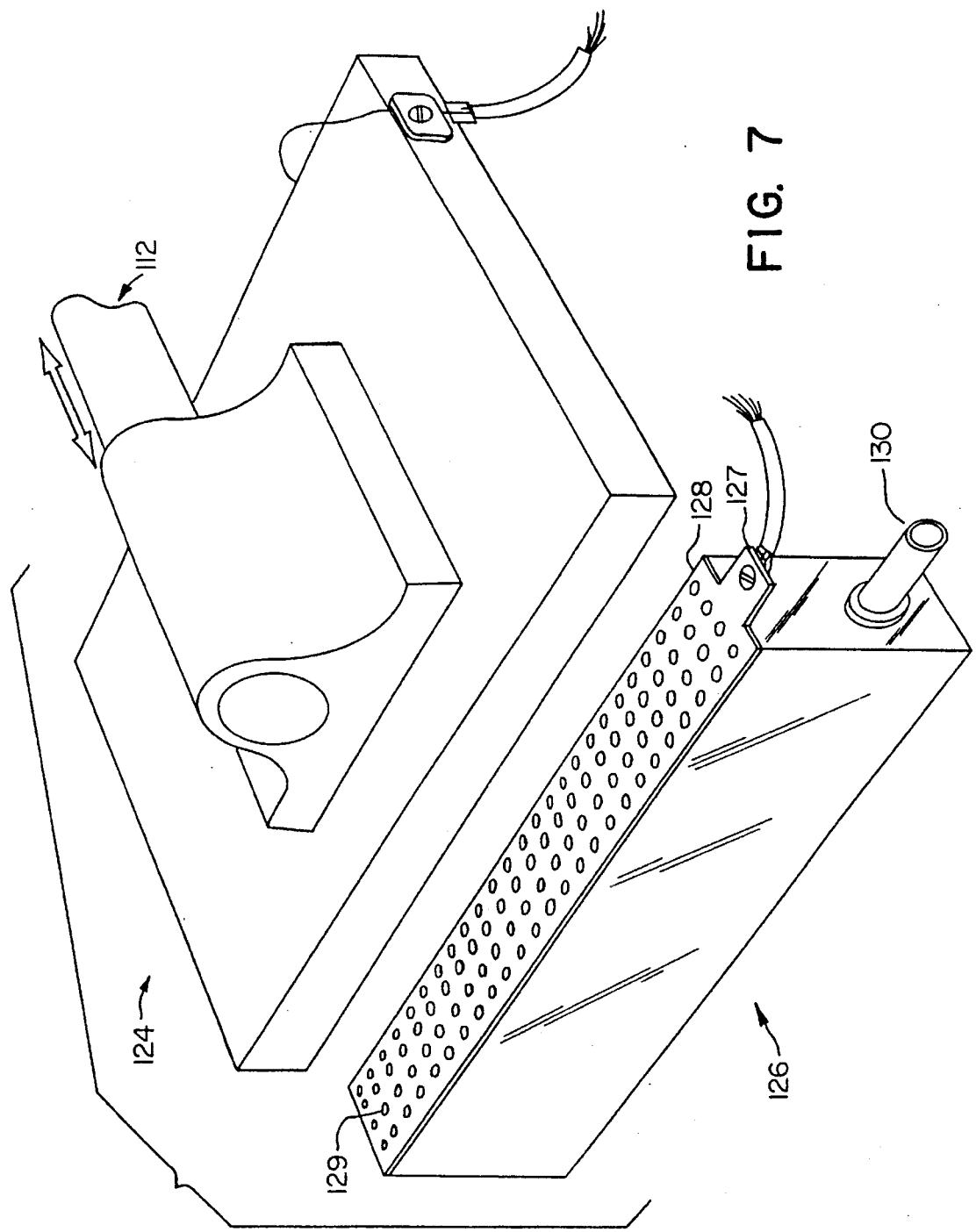
FIG. 7 is a perspective view of a multi-nozzle assembly for linear jet etching.

FIG. 7 shows the preferred embodiment of a linear electrode. This apparatus is substantially the same as that disclosed in U.S. Pat. No. 5,284,554, issued to Datta et al. on Feb. 8, 1994, assigned to International Business Machines Corporation, and incorporated herein by reference. In the present FIG. 7 the drawing numbers are equal to the drawing numbers of the '554 patent plus 100, for the corresponding parts.

In FIG. 7 a nozzle assembly 126 is shown in position below a substrate holder 124. The substrate holder 124 is fixed to a moving stage 112 which moves axially by a conventional mechanism (not shown) to slowly sweep the carrier stage 112 over the nozzle assembly 126 as indicated by the arrow in FIG. 7. The scan speed is adjustable.

A nozzle plate 128 is mounted atop the hollow elongated nozzle assembly 126, which is made of plexiglass or the like. The nozzle plate 128 contains many through holes 129. The interior space contained by the walls of the nozzle assembly 126 and the nozzle plate 128 is filled with pressurized electrolyte (not shown) through a fitting 130. The electrolyte spurts out through the plurality of holes 129, creating an elongated jet of electrolyte atop the nozzle plate 128, which is about 2 cm wide and about 15 cm long. The holes are carefully spaced on 3-mm centers, and the diameter of the holes is 2 mm.

The substrate S is removably attached to the underside of the substrate holder 124 in an inverted position, and is not visible in FIG. 7. The clearance between the top surface of the nozzle plate 128 and the anode A layer, as the stage 112 scans the holder 124 over the nozzle assembly 126, is 3 -mm.

As the stage 112 scans the substrate S over the nozzle plate 128, electrolyte completely fills the 3 mm inter-electrode gap and then runs down over the nozzle assembly 126. Etching takes place only where the electrolyte impinges, over the nozzle plate 128.

The preferred flow rate is 1.5 gallons per minute with 3 M $NaNO_3$ and 2 M ethylene glycol as the electrolyte. The preferred scan rate is 2 cm/s.

Nozzle plate 128 is desirably comprised of stainless steel. It includes a tab 127 for electrical connection to a power supply (not shown). The plate 128 serves as a cathode. The opposite-polarity terminal of the power supply is connected to the plated copper layer (A in FIG. 6; not visible in FIG. 7.)

Voltage can be applied either as a steady DC (direct current) or as PC (pulsating current). Preferably, a voltage of 10 V is delivered in pulses lasting 10 ms (ms is the symbol for a millisecond, a thousandth of a second). The duty cycle (proportion of time during which the electricity is applied) is 30%. The metal removal rate is 1.4 micron/min.

In a test of an exemplary embodiment of the present invention, a layer of metal 8.3 microns thick was removed and the surface examined. It was found that the difference between the highest and lowest points on the surface (the peak-to-peak variation) was 1 micron, or 12% of the total of 8.3 µ. The average variation over the surface was 3.5%.

These measurements are comparable to those obtained with the LLNL device. However, the present invention is simpler, removes metal faster, is safer, and creates less hazardous waste than the LLNL device.

The use of a linear electrode rather than a flat or surface electrode has several advantages.

The thin linear electrode has a surface area less than the area of the anodic copper layer in most cases. Because of this, its use reduces the amount of total current required for the electroetching device while keeping the local current density high. A large current density is needed for electropolishing, but a large total current requires larger and more expensive electrical components: wires, transformers, diodes, and switching circuits used for pulsed current.

Second, it reduces "stray" currents which can cause uneven etching. Such currents can only propagate in one direction along a linear electrode, as opposed to two.

Third, if a close tolerance is to be maintained between a flat surface and the electrode, it is less expensive to do with a linear electrode and a linear track. A plane surface is more expensive to machine than several straight edges.

Fourth, hydrodynamic considerations are simpler for a linear electrode. To establish a uniform flow between two plates spaced a millimeter apart would require leak-proof seals along three edges: where electrolyte is pumped into the inter-electrode gap and along two side edges. If the electrolyte were introduced through holes in the cathode plate surface, then uniform flow velocity over the anode surface would be difficult. Depletion of electrolyte as it flowed through could be a problem, and there would be a trade-off between the flow rate and the etching rate. Finally, the larger area of flow would encourage turbulence, and persistent eddies are known in the art to cause irregular etching.

The multi-nozzle cell can be used for plating as well as for etching, by reversing the voltage polarity and changing the electrolyte. The substrate S may thus be plated and then etched without removing it from the holder 124. Many of the advantages and aspects of the present invention for etching will carry over to plating, which is a process converse to etching.

The invention can be applied to the fabrication of thin-film packages. The process may also find application in many other electronic packages and components where excess layers of conducting materials are required to be removed without introducing defects. The invention's technique may be used instead of chemical-mechanical polishing (eg., to remove excess copper in BEOL).

The invention can also be applied to curved anode surfaces as well as to flat ones, for example, a cylindrical or conical surface over which a straight linear electrode can scan. Doubly-curved anode surfaces, such as hemispheres, can be scanned by a curved linear electrode. These are within the scope of the present invention. In such cases, the word "planarization" shall be interpreted to mean smoothing, i.e., making locally plane.

As a result of the aforementioned features, numerous advantages are obtained. For example, metal may be removed at a high rate of speed (e.g. 1.4 micron/min). Furthermore, because a neutral salt solution (e.g. Sodium Nitrate) may be used as the electrolyte, safety and waste disposal problems are minimized. In addition, the simplified tool can be readily manufactured and maintained.

In general, it is to be understood that the invention includes all within the scope of the following claims.

What is claimed:

1. An electrochemical cell for electrochemical planarization of a first electrode surface, comprising:

a second electrode surface generally parallel to the first electrode surface;

scanning means for relative lateral motion of the second electrode surface parallel to the first electrode surface;

means for providing an aqueous electrolyte;

additive substance means for providing an electrical resistance additive substance;

impingement means for a) combining said aqueous electrolyte and said electrical resistance additive substance to form a resistive electrolytic salt mixture and b) disposing said resistive electrolytic salt mixture by localized impingement towards said first electrode surface and from said second electrode surface; and voltage means;

wherein the first electrode surface is electrochemically planarized when a potential difference is applied across the cell by the voltage means.

2. An electrochemical cell according to claim 1, further comprising mixture flow means for controlling flow of mixture between the first electrode surface and the second electrode.

3. An electrochemical cell according to claim 1, where said impingement means includes a nozzle plate having a plurality of holes frown which said resistive electrolytic salt mixture is sprayed.

4. An electrochemical cell for electrochemical planarization of a first electrode surface, comprising:

a second electrode surface generally parallel to the first electrode surface;

scanning means for relative lateral motion of the second electrode surface parallel to the first electrode surface;

means for providing an aqueous electrolyte;

additive substance means for providing an electrical resistance additive substance;

means for a) combining said aqueous electrolyte and said electrical resistance additive substance to form a resistive electrolytic salt mixture and b) disposing said resistive electrolytic salt mixture between said first electrode surface and said second electrode surface; and voltage means;

wherein the first electrode surface is electrochemically planarized when a potential difference is applied across the cell by the voltage means; and wherein the additive substance means provides the additive substance in the form of a resistive organic substance at a molarity greater than 1 M.

5. An electrochemical cell according to claim 2, wherein the additive substance means provides the additive substance in the form of a resistive organic substance at a molarity greater than 2 M.

6. An electrochemical cell according to claim 2, wherein the additive substance means provides the additive substance in the form of a resistive organic substance at a molarity greater than 4 M.

7. An electrochemical cell according to claim 2, wherein the additive substance means provides the additive substance in the form of ethylene glycol at a molarity of 1 M to 3 M.

8. An electrochemical cell for electrochemical planarization of a first electrode surface, comprising:

a second electrode surface generally parallel to the first electrode surface;

scanning means for relative lateral motion of the second electrode surface parallel to the first electrode surface;

means for providing an aqueous electrolyte;

additive substance means for providing an electrical resistance additive substance;

means for a) combining said aqueous electrolyte and said electrical resistance additive substance to form a resistive electrolytic salt mixture and b) disposing said resistive electrolytic salt mixture between said first electrode surface and said second electrode surface; and voltage means;

wherein the first electrode surface is electrochemically planarized when a potential difference is applied across the cell by the voltage means; and wherein the first electrode surface is copper and the electrolyte is selected from the group consisting of NaNO$_3$ at a molarity of 2 M to 4 M and NaCl at a molarity of 2 M to 4 M.

9. An electrochemical cell according to claim 8, wherein the additive substance means provides the additive substance in the form of ethylene glycol at a molarity of 1 M to 3 M.

10. An electrochemical cell for electrochemical planarization of a first electrode surface, said electrochemical cell comprising:

a second electrode surface generally parallel to the first electrode surface;

scanning means for providing relative lateral motion of the second electrode surface parallel to the first electrode surface;

means for providing an electrolyte having a viscosity less than 20 centipoises and an ohmic resistivity of more than 5.0 ohm-centimeter and for disposing said electrolyte between said second electrode surface and said first electrode surface; and voltage means;

wherein the first electrode surface is electrochemically planarized when a potential difference is placed across the cell.

11. A method of planarizing metal film on a substrate surface, the method including the steps of:

providing a cathode;

providing an aqueous electrolyte disposed between the film and the cathode;

adding an electrical resistance additive substance to the electrolyte;

mixing the electrolyte and the additive substance to form a resistive electrolytic mixture;

providing voltage means;

spraying the resistive electrolytic mixture through localized impingement onto said metal film; and establishing a potential difference between the film and the cathode by the voltage means while performing relative lateral motion of the cathode parallel to the film so that the film is electrochemically planarized.

12. The method according to claim 11, wherein the film is copper and the electrolyte is selected from the group consisting of NaNO$_3$ at a molarity of 2 M to 4 M and NaCl at a molarity of 2 M to 4 M.

13. The method according to claim 12, wherein the additive substance is ethylene glycol at a molarity of 1 M to 3 M.

14. The method according to claim 11, wherein an interelectrode distance between the film and the cathode is less than or equal to 3 millimeters.

15. The method according to claim 11, wherein the cathode is linear and the film is planar, and further including:

mixture flow means for flow of mixture between the film and the cathode.

16. The method according to claim 15, wherein an interelectrode distance between the film and the cathode is less than or equal to 3 millimeters.

17. A method of planarizing metal film on a substrate surface, the method including the steps of:

providing a cathode;

providing an aqueous electrolyte disposed between the film and the cathode;

adding an electrical resistance additive substance to the electrolyte;

mixing the electrolyte and the additive substance to form a resistive electrolytic mixture;

providing voltage means;

spraying the resistive electrolytic mixture through localized impingement onto said metal film; and establishing a potential difference between the film and the cathode by the voltage means while performing relative lateral motion of the cathode parallel to the film so that the film is electrochemically planarized, wherein the additive substance is a resistive organic substance at a molarity greater than 1 M.

18. The method according to claim 13, wherein the additive substance is a resistive organic substance at a molarity greater than 4 M.

19. The method according to claim 13, wherein the additive substance is ethylene glycol at a molarity of 1 M to 3 M.

20. An electrochemical cell for electrochemical planarization of a first electrode surface, comprising:

a second electrode surface generally parallel to the first electrode surface and spaced from the first electrode surface by less than or equal to 3 millimeters;

scanning means for relative lateral motion of the second electrode surface parallel to the first electrode surface;

an aqueous electrolyte adapted to be disposed between the second electrode surface and the first electrode surface;

an electrical resistance additive substance mixed with the electrolyte to form a resistive electrolytic mixture; and voltage means;

wherein the first electrode surface is electrochemically planarized when a potential difference is applied across the cell by the voltage means.

21. An electrochemical cell for electrochemical planarization of a planar first electrode surface, comprising:

a linear second electrode surface generally parallel to the first electrode surface;

scanning means for relative lateral motion of the second electrode surface parallel to the first electrode surface;

an aqueous electrolyte adapted to be disposed between the second electrode surface and the first electrode surface;

an electrical resistance additive substance mixed with the electrolyte to form a resistive electrolytic mixture;

means for spraying the resistive electrolytic mixture onto said first electrode surface by localized impingement; and voltage means;

wherein the first electrode surface is electrochemically planarized when a potential difference is applied across the cell by the voltage means.

22. An electrochemical cell according to claim 21 wherein an inter-electrode distance between the first electrode surface and the second electrode is less than or equal to 3 millimeters.

* * * * *